United States Patent
De Gaillard

(10) Patent No.: US 6,874,838 B2
(45) Date of Patent: Apr. 5, 2005

(54) MOTOR VEHICLE WITH A TAILGATE

(75) Inventor: Francois De Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/456,900

(22) Filed: Jun. 9, 2003

(65) Prior Publication Data

US 2003/0227188 A1 Dec. 11, 2003

(30) Foreign Application Priority Data

Jun. 9, 2002 (DE) .......................................... 102 25 482

(51) Int. Cl.[7] .......................... B62D 33/03; B62D 25/10
(52) U.S. Cl. ........................ 296/51; 296/76; 414/557
(58) Field of Search ........................... 296/50–52, 57.1, 296/76; 414/557, 545

(56) References Cited

U.S. PATENT DOCUMENTS

| | | | | |
|---|---|---|---|---|
| 1,889,679 A | * | 11/1932 | Marin | 296/64 |
| 2,953,409 A | * | 9/1960 | Barenyi | 296/187.03 |
| 3,065,869 A | * | 11/1962 | Mathers et al. | 414/557 |
| 3,082,033 A | * | 3/1963 | Bosher | 296/26.02 |
| 3,275,170 A | * | 9/1966 | MacRae et al. | 414/557 |
| 3,800,915 A | * | 4/1974 | Himes | 414/545 |
| 3,978,996 A | * | 9/1976 | Oltrogge | 414/527 |
| 4,702,511 A | * | 10/1987 | Olins | 296/57.1 |
| 4,799,849 A | | 1/1989 | Miller | |
| 6,227,594 B1 | | 5/2001 | Pommeret | |
| 2001/0004155 A1 | | 6/2001 | Decker et al. | |
| 2001/0013710 A1 | | 8/2001 | Pommeret | |

FOREIGN PATENT DOCUMENTS

| | | | |
|---|---|---|---|
| DE | 196 15 540 A1 | 4/1997 | |
| DE | 196 19 126 A1 | 11/1997 | |
| DE | 198 11 815 A1 | 9/1999 | |
| DE | 199 56 743 A1 | 5/2001 | |
| EP | 0 357 973 B1 | 3/1990 | |
| EP | 1 065 083 A1 | 1/2001 | |
| EP | 1 162 116 A2 | 12/2001 | |
| EP | 1 201 496 A1 | 5/2002 | |
| FR | 2699867 | * 7/1994 | 296/57.1 |
| FR | 2 748 969 | 11/1997 | |

* cited by examiner

Primary Examiner—Dennis H. Pedder
(74) Attorney, Agent, or Firm—Nixon Peabody LLP; David S. Safran

(57) ABSTRACT

A motor vehicle, especially a sedan or a station wagon, with a tailgate (9) which is movably supported on the motor vehicle by a bearing means for closing and for clearing a rear loading opening (14) of the vehicle interior or trunk (3), and the tailgate (9) can be moved by the bearing means (16, 26) in a lowering or raising motion between its closed position and a lowered open position, in which it is located in essentially vertical alignment with the motor vehicle rear end of the motor vehicle (2). The tailgate (9) can be swung out to the rear around its bottom edge (24) in order to form a load-bearing surface. The swung-out tailgate (9) in the essentially horizontal swung-out position can be moved by the bearing means (16, 26) in lowering and raising motions as a means for raising and lowering cargo.

8 Claims, 7 Drawing Sheets

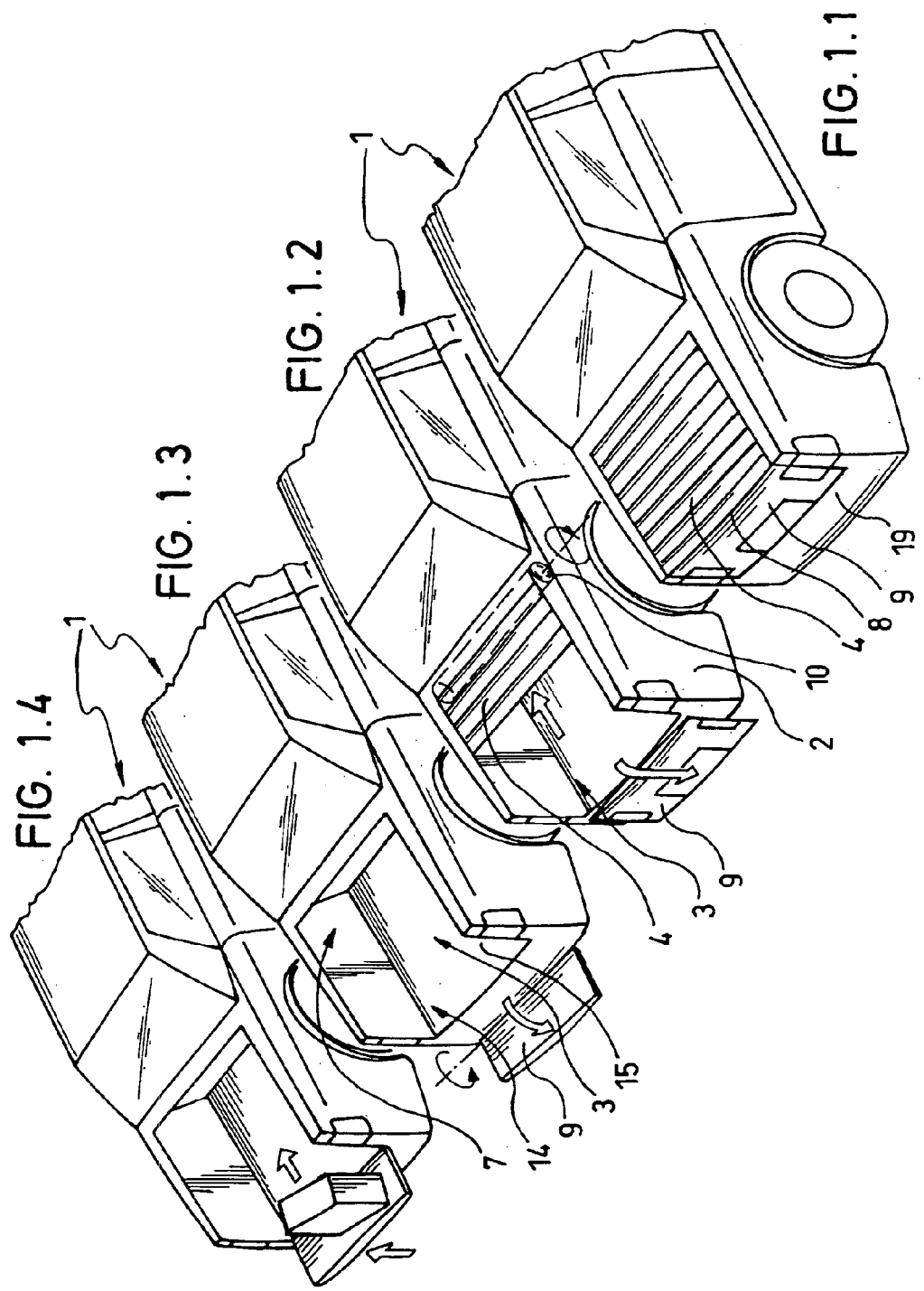

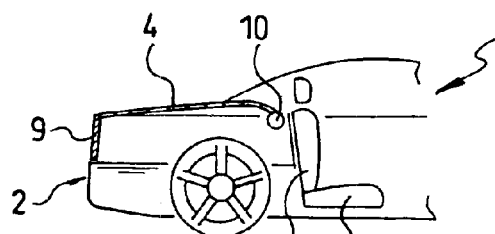
FIG. 2.1
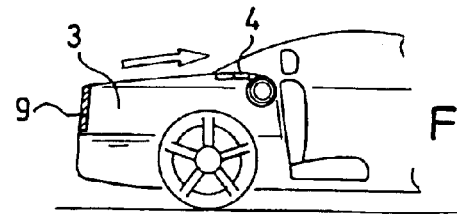
FIG. 2.2
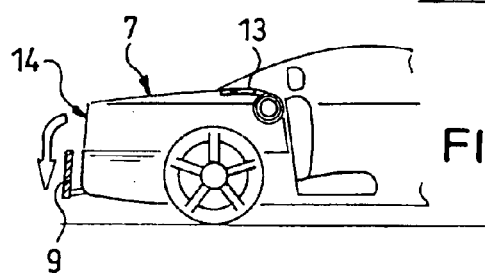
FIG. 2.3
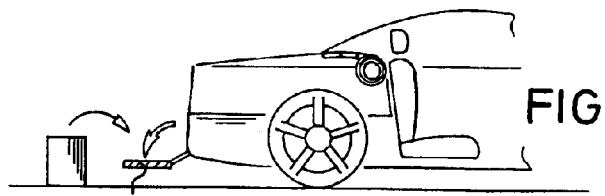
FIG. 2.4
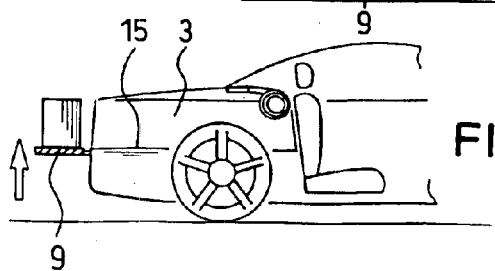
FIG. 2.5
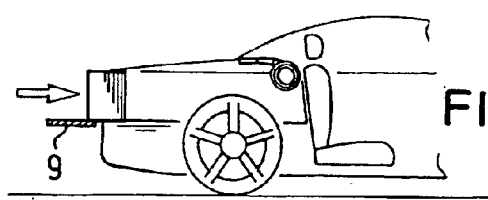
FIG. 2.6

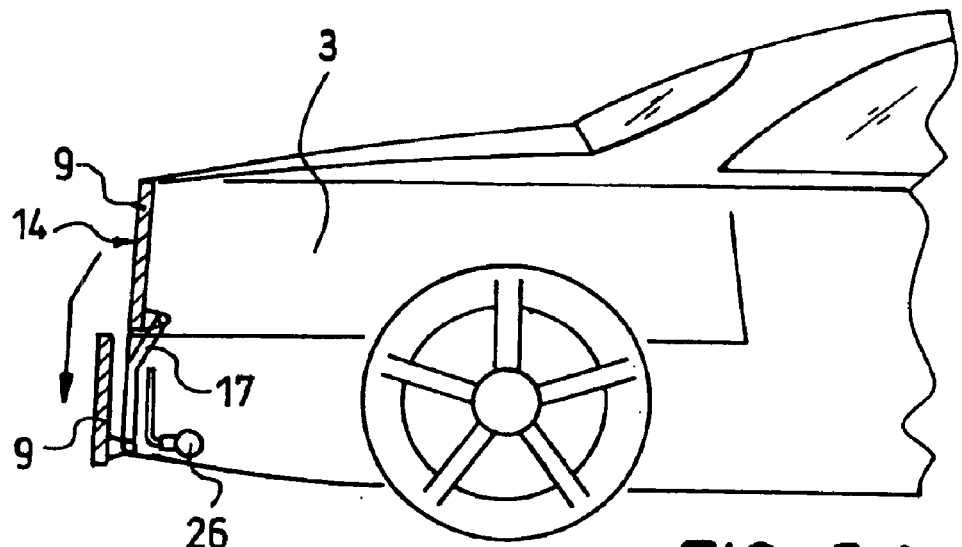
FIG. 5.1
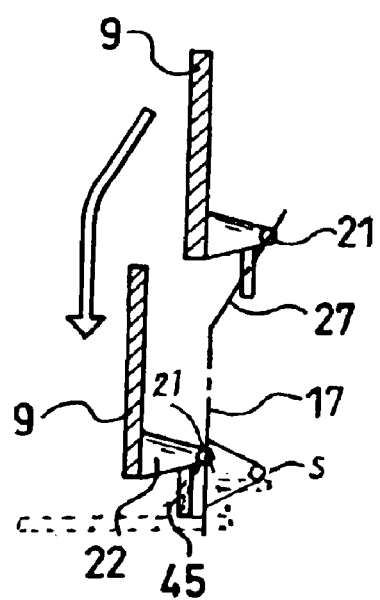
FIG. 5.2

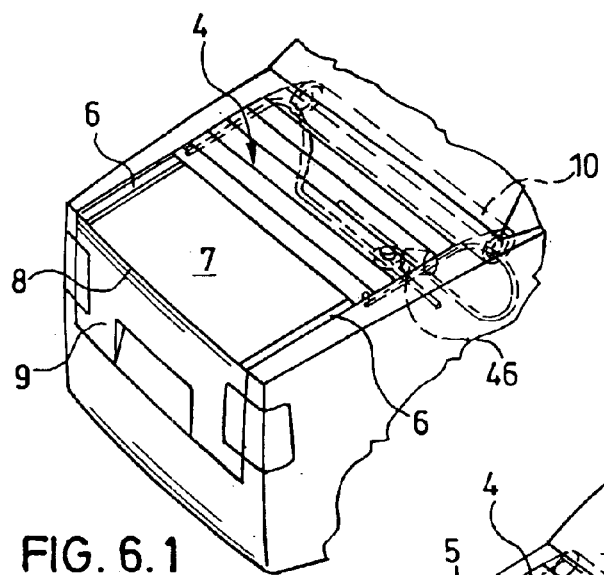
FIG. 6.1
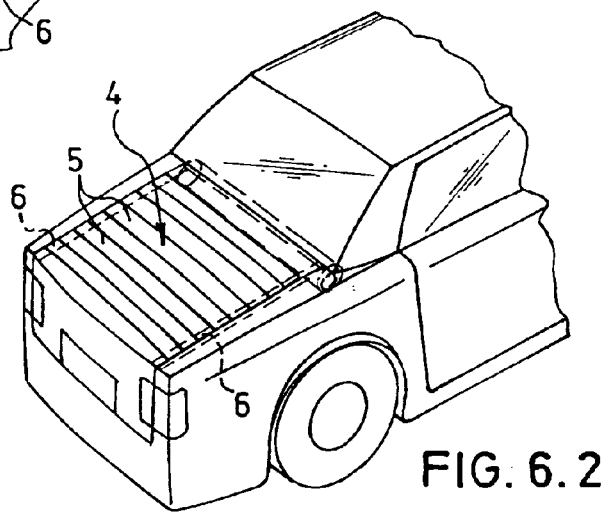
FIG. 6.2
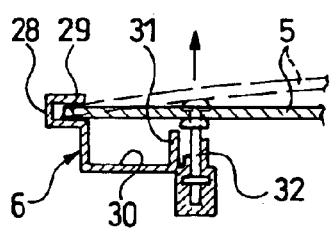
FIG. 6.4
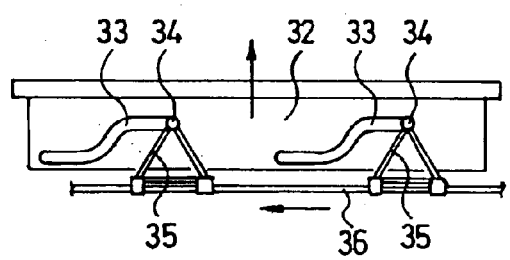
FIG. 6.3
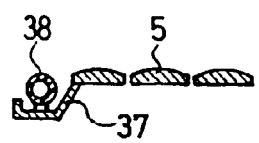
FIG. 6.5

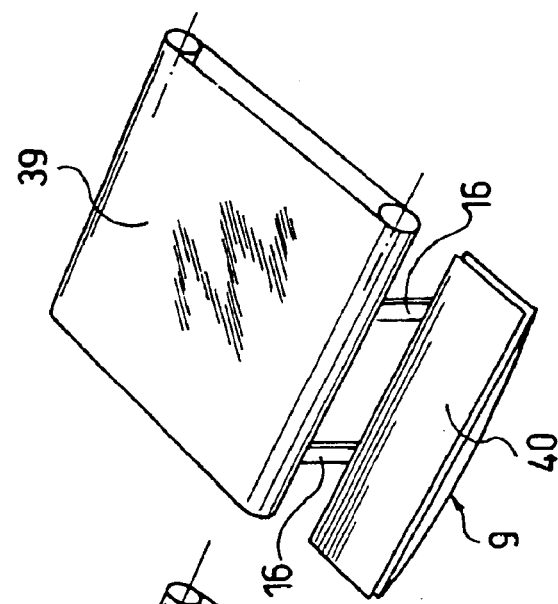
FIG. 7.1
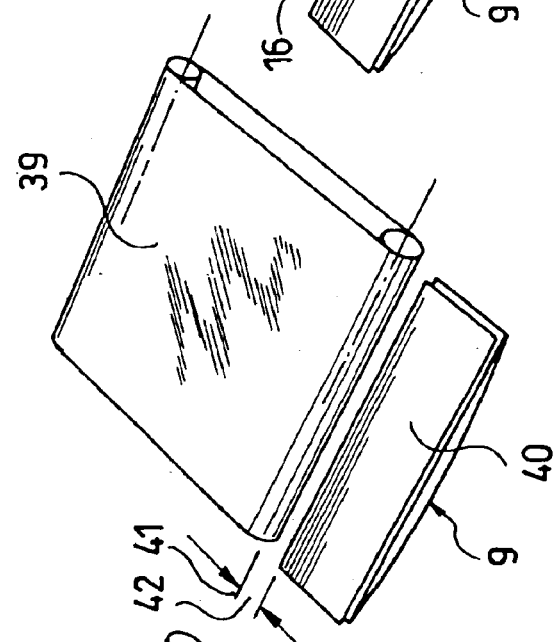
FIG. 7.2
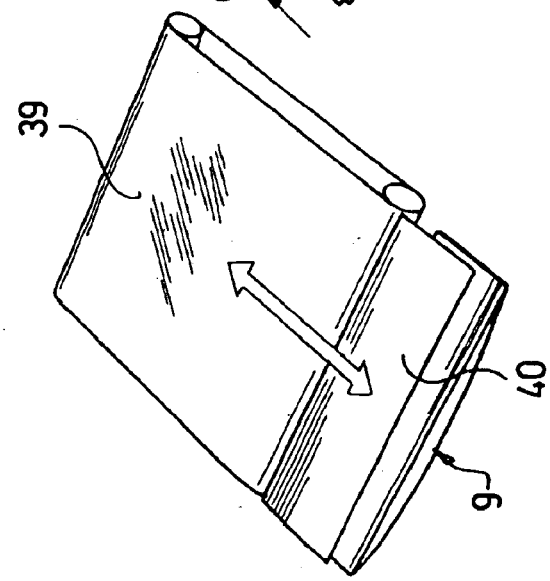
FIG. 7.3

MOTOR VEHICLE WITH A TAILGATE

BACKGROUND OF THE INVENTION

1. Field of the Invention

The invention relates to a motor vehicle, especially a sedan or a station wagon, with a tailgate which is movably supported on the motor vehicle by a bearing means for closing and for clearing a rear loading opening of the vehicle interior or trunk space. Furthermore, the invention relates to a motor vehicle, especially a sedan, with a rear-side trunk space and a tailgate which is movably supported on the motor vehicle by a bearing means for closing and for clearing a rear loading opening of the trunk space.

2. Description of Related Art

Published German patent application DE 196 15 540 A1 discloses a station wagon with a top tailgate which swings up and with a bottom tailgate which swings down. By swinging one or both tailgates in the conventional manner the cargo space is accessible from the rear. A comparable passenger car is also disclosed in U.S. Pat. No. 6,227,594 B1.

SUMMARY OF THE INVENTION

The primary object of the present invention is to devise a motor vehicle with a tailgate of the initially mentioned type with a rear area which can be used for diverse purposes due to great variability.

This object is achieved as in accordance with the invention by a motor vehicle with a tailgate which is movably supported on the motor vehicle by a bearing means for closing and for clearing the rear loading opening of the vehicle interior or trunk space, the tailgate being moved by the bearing means in a lowering or raising motion between its closed position and the lowered open position, in which it is located on the motor vehicle rear in an essentially vertical alignment. Since the tailgate can be moved by the bearing means in a lowering or raising motion between its closed position and the lowered open position, in which it is located on the vehicle rear in an essentially vertical alignment, the rear access opening to the trunk space or the cargo space can be opened under space conditions which are constricted at the rear of the vehicle. In addition, the motor vehicle can have a top tailgate which swings upward.

The object is also achieved by a motor vehicle with a tailgate which is movably supported on the motor vehicle by a bearing means for closing and for clearing the rear loading opening of the trunk space, wherein the upper trunk opening can be closed by a cover means which has several cover parts which can be moved forward into the open position and which are supported to be able to move on either side of the trunk opening, and wherein the tailgate can be swung into the horizontal position and can be moved vertically by the bearing means for raising and lowering the cargo. In this motor vehicle in which the upper trunk opening can be closed by a cover means which has several cover parts which can be moved forward into the open position and which are supported to be able to move on either side of the trunk opening, and in which the tailgate can be swung into the horizontal position and can be moved vertically by the bearing means for raising and lowering the cargo, diverse possible applications are especially advantageous with a high level of user-friendliness.

When the tailgate is swung out to the rear around its bottom edge in order to form a load-bearing surface, the cargo surface of the trunk space or the cargo space can be lengthened. Then, it is advantageous if the swung-out tailgate can be moved in the essentially horizontal swung-out position by the bearing means in a lowering or raising motion as a raising means for the cargo. Thus, heavy loads can also be lifted with a much smaller expenditure of force onto the trunk floor or the cargo surface. Unloading is facilitated in the same way.

Feasibly, the bearing means contains a vertical guide means which is mounted on the motor vehicle for the tailgate, on which at least one pivot bearing part which is attached to the tailgate is supported to be able to slide and swing, and the vertical guide means can have two vertical guides and each vertical guide contains at least one guide rail. In contrast to a pivoted lever means, the linear or slightly curved guide rails are simple components which can also accommodate high loads and forces with a simple structure.

In order to move the tailgate into the tightly closed position in the rear trunk opening, it is advantageous if the tailgate is moved into its closed position against the vehicle result of the curved path of the lifting motion in the top section of each vertical guide.

In one simple configuration, a s roll-up blind means forms an upper covering which can be wound onto a take-up shaft which is located hidden in front of the trunk opening. However, other coverings with several cover elements can also be used; they can be moved forward into the body into the lowered position, for example, in a stacked arrangement, in order to clear the upper trunk opening.

Functionally, louvers of the roll-up blind means or the cover parts of the covering are guided on guides located on either side of the upper trunk opening, and on the guides, there are lifting strips which can be extended from bottom to top against the louvers or the cover parts in order to press them against the bearing section of the respective guide. Rattling noise is thus avoided and arching of the louvers can be produced so that water on the louvers can drain more easily to the side.

One embodiment of the motor vehicle is explained in detail below with reference to the drawings.

BRIEF DESCRIPTION OF THE DRAWINGS

FIGS. 1.1 to 1.4 are perspective rear views of a passenger car in different states of opening and use of the vehicle rear;

FIGS. 2.1 to 2.6 are side views of the rear of the passenger vehicle in different states of opening and use.

FIG. 5.1 is a side view of the vehicle rear with a representation of the closed and opened tailgate;

FIG. 5.2 is a side view of the tailgate in the closed position and in the lowered open position;

FIG. 6.1 is a perspective view of the vehicle rear with a blind means for covering the upper trunk opening;

FIG. 6.2 is a perspective view of the vehicle rear with blind means closed;

FIG. 6.4 is a cross-sectional view a side guide and the lifting means for the blind means; and FIG. 6.5 shows a gutter on the rear edge of the last louver;

FIGS. 7.1 to 7.3 are perspective views of different positions of the tailgate relative to the trunk floor.

DETAILED DESCRIPTION OF THE INVENTION

Figure 3:
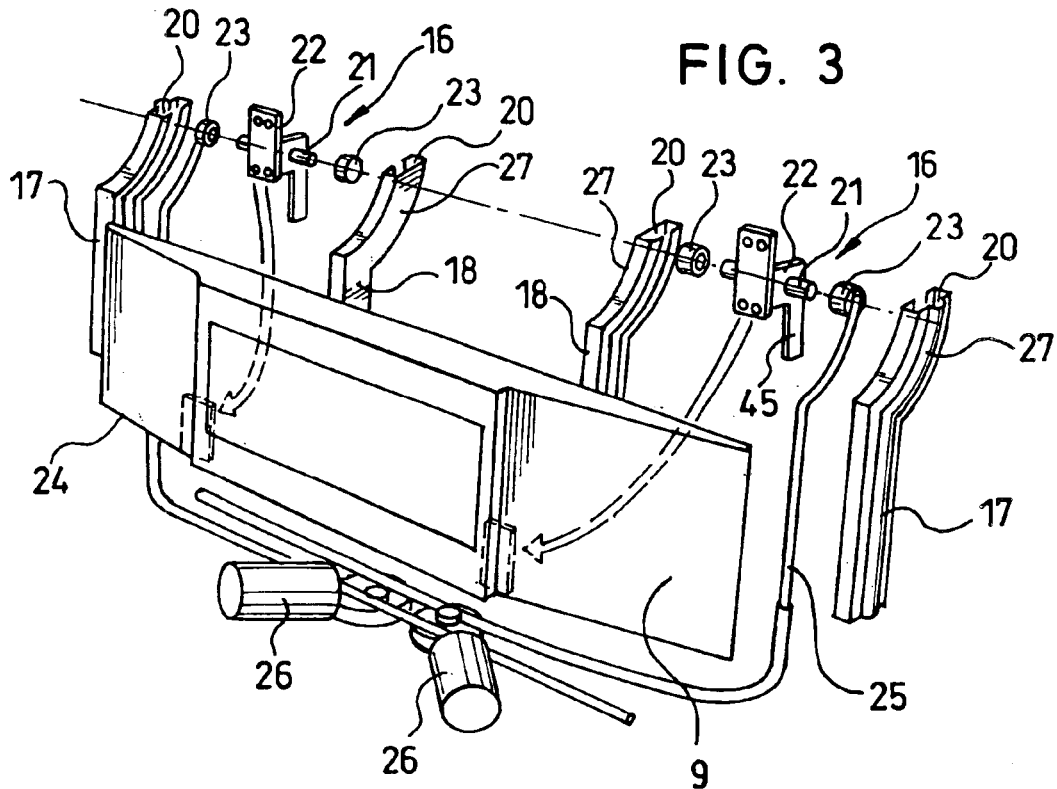
FIG. 3 is a perspective view of a tailgate with a bearing and drive means.

A passenger vehicle 1, for example, a notchback sedan (see, for example, FIGS. 1.1–1.4) in the vehicle rear 2 has a trunk 3. The trunk 3, as the upper covering, contains a roll-up blind 4 formed of louvers 5 which are movably supported on two guide rails 6 which are located on both sides of the top trunk opening 7 (see FIG. 6.1). The blind 4 can be moved out of its closed position in which it borders the top edge 8 of a closed tailgate 9, via intermediate positions (FIG. 1.2), forward into its open position (FIG. 1.3). When the blind 4 is opened, the louvers 5 are wound onto a take-up shaft 10 which is located behind the back 11 of the back seat 12 under a lining or hat rack 13.

Figure 4:
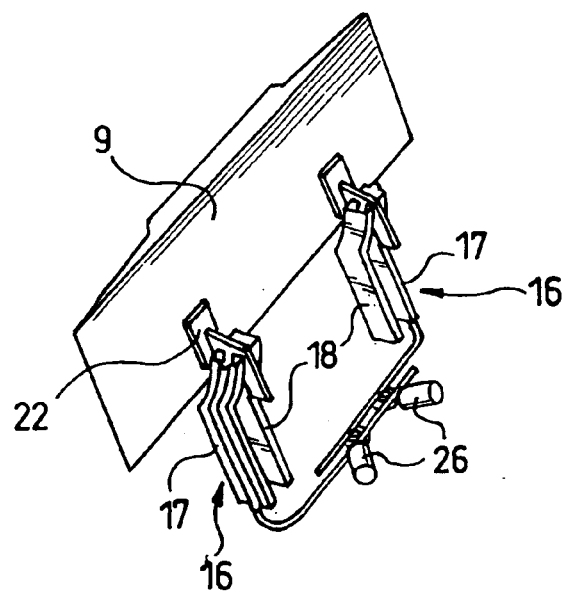
FIG. 4 is a perspective view of the inside of the closed tailgate with bearing and drive means.

The tailgate 9 closes a rear trunk opening 14 which extends roughly to the bottom 15 of the trunk 3, and is slightly angled in the closed position, essentially vertical or inclined relative to vertical. The tailgate 9 is movably supported by a bearing means which has two vertical guide means 16 (FIGS. 3 & 4) which are located on the vehicle rear 2. Each vertical guide means 16 has two adjacent guide rails 17 and 18, which are located on the inside of a fixed rear wall 19 of the vehicle 1 which runs underneath the rear trunk opening 14 and have guide grooves or guideways 20 which are face one another and in which a pivot axle 21 of the bearing part 22 is movably guided via a sliding block 23. The bearing part 22 is mounted on the inside of the tailgate 9 in the area of its bottom edge 24 and extends through a slotted opening (not shown) in the rear wall 19.

The pivot axle 21 or the sliding block 23 is connected to a drive cable 25 which can be driven by a drive unit with one or more drive motors 26. The drive motor or motors 26 are supported on the body.

The guide rails 17, 18 each have an upper section 27 which runs upward and forward in the lengthwise direction of the vehicle, and which is shaped such that the bearing part 22 is moved forward in as it is raised into the upper section 27. Thus, the tailgate 9 is pressing into a tightly closed position (FIGS. 5.1 and 5.2) against the body which surrounds the rear trunk opening 14 when it is raised.

The lateral guide rails 6 for the, for example, aluminum louvers 5 of the blind 4 of the trunk 3, have a U-shaped bearing section 28 (FIG. 6.4) for guiding the outside ends 29 of the louvers 5. Underneath the U-shaped bearing section 28, a gutter 30 is provide with an upstanding inside web 31. Next to web 31 is a lifting rail 32 which runs over the length of the guide rail 6 and which can be raised and lowered in the vertical direction, but can be fixed in the lengthwise direction. The raising and lowering of the lifting rail 32 take place by mean of two cam tracks 33 which are spaced apart from one another (see FIG. 6.3) and in which two journals 34 are movably held. The journals 34 are attached to carrier parts 35 which are movably supported on the guide rail 6 and are connected to a drive cable 36 so that they can be raised as well as lowered at the same time. In this way, the louvers 5, in the closed state, or in the partially open state in the bearing section 28 of the guide rail 6, can be pressed up by pulling on the cable opposite the arrow in FIG. 6.3, so that rattling noise can be prevented.

Furthermore, the louvers 5 are upwardly arched such that the water can run laterally to the guide rails 6 and into the gutters 30. On the rear edge of the last louver 5 (FIG. 6.5), there is a drip molding 37 with a seal 38 which is caused to engage the top edge 8 of the closed tailgate 9, forming a seal.

The floor 15 of the trunk 3, in one preferable embodiment, is made as a sliding cargo floor 39, for example, in the form of a peripheral flexible structure which can be pushed to slide in the lengthwise direction on the fixed floor surface.

Figure 8:
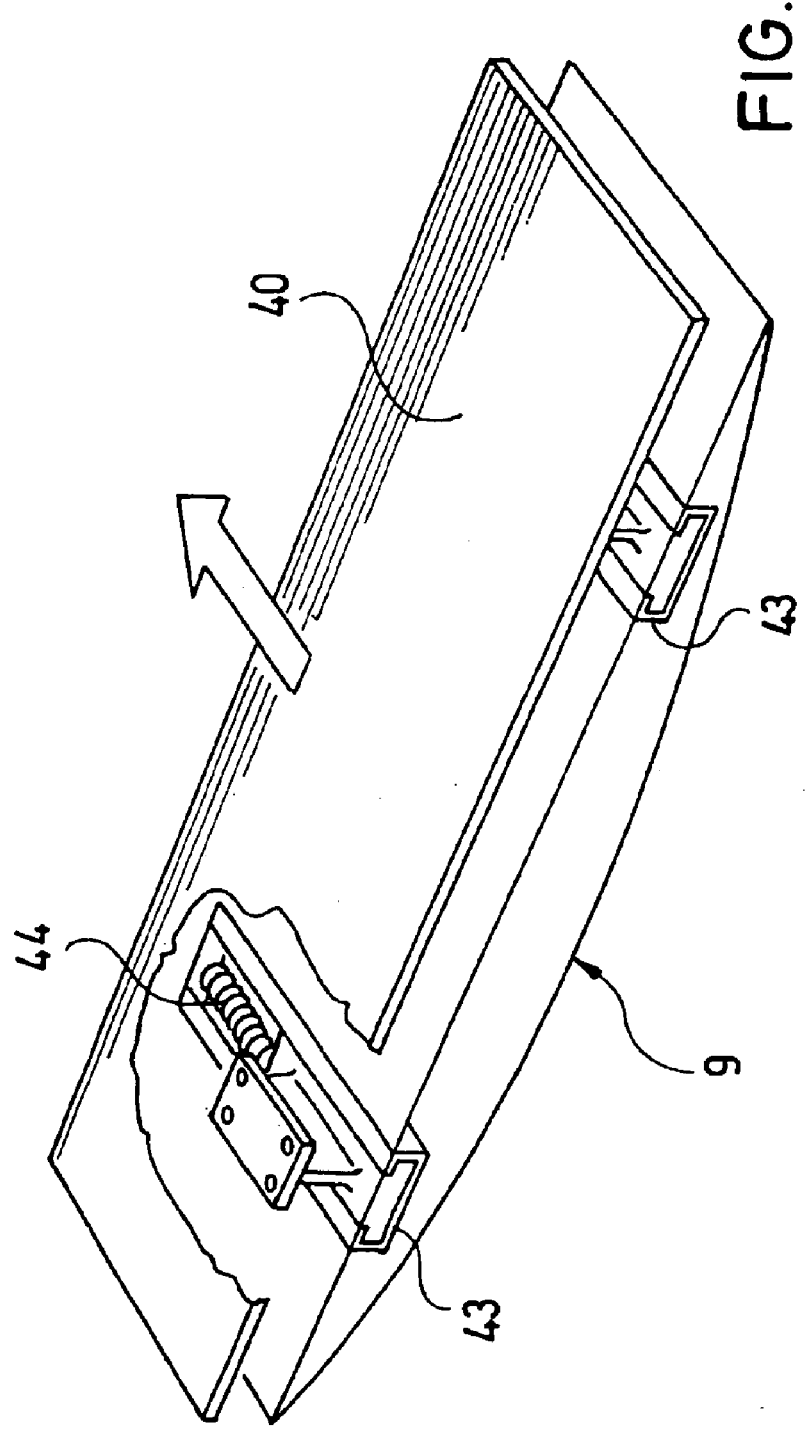
FIG. 8 is a perspective view of a movable cargo floor on the inner side of the tailgate.

Furthermore, a sliding cargo floor 40 can be provided on the inside of the tailgate 9. When the tailgate 9 is folded down into its horizontal position, the sliding cargo floor 40 is spaced away from the rear edge 41 of the trunk floor 15 or the sliding cargo floor 40. In order to bridge this gap 42, the sliding cargo floor 40, which is supported on the guide rails 43 (see FIG. 8), is pushed forward time toward the trunk floor 15 or the sliding cargo floor 40 against the force of a spring 44 in each guide rail 43.

The blind 4 can be moved forward partially or entirely by a drive means 46 out of the position in which both the tailgate 9 and the blind are closed (FIGS. 1.1 & 2.1) in order to open the top trunk opening 7 accordingly. Furthermore, the tailgate 9, both with the blind 4 closed and open, can be lowered to open the rear trunk opening 14 alone or continuously with the upper trunk opening 7. With the blind 4 closed, the trunk 3 is likewise accessible by lowering the tailgate 9. Here, the vertical lowering of the tailgate 9 requires less space behind the vehicle rear 2 and is thus advantageous for parking in narrow spaces.

By swinging, which can take place via motorized driving, or in a simple version, also manually, the lowered tailgate 9 is moved into a roughly horizontal position in which the inside of the tailgate 9 faces upward and one arm 45 of the bearing part 22 strikes a stop S (schematically depicted in FIG. 5.2) and which likewise moves with the tailgate 9 on the vertical guide 16. Cargo can be placed on the tailgate 9 and is raised to the level of the floor 15 of the trunk 3 by motorized raising of the tailgate 9 by the bearing means. The cargo is thus pushed onto the floor 15 of the trunk 3 at the same level, and the two sliding cargo floors 39 and 40 can support the pushing of the cargo.

In the lowered, horizontal loading position the tailgate 9 can also be used as a load carrier, for example, as a bicycle carrier. For this purpose, additional holders can be mounted on the tailgate 9 and/or on the rear body.

When the blind 4 is opened, the trunk 3 forms an open cargo surface in the manner of a pickup truck. By swinging down the tailgate 9 to the level of the loading surface the latter can be lengthened accordingly.

What is claimed is:

1. Motor vehicle, comprising:
  a vehicle body,
  a tailgate,
  bearing means movably supporting the tailgate on the motor vehicle for closing and for clearing a rear loading opening of a trunk space of the vehicle body, and
  a cover means for closing an upper trunk opening of the vehicle body, said cover means being formed of a plurality of cover parts which are movable forward from a closed position into an open position, the cover parts being supported on each side of the upper trunk opening,
  wherein the tailgate is mounted so as to be able to rearwardly swing out around a bottom edge thereof into a swung out horizontal position in which the tailgate forms a load-bearing surface and wherein the tailgate in said horizontal position is vertically movable by the bearing means for raising and lowering cargo thereon;
  wherein the bearing means comprises a vertical guide arrangement which is mounted on the motor vehicle body and on which at least one pivot bearing part which is attached to the tailgate is supported in a slidable and pivotable manner;

wherein the vertical guide arrangement has two vertical guides, each of which has at least one guide rail; and wherein the vertical guides have at top section configured to move the tailgate inward against the vehicle rear during lifting of the tailgate into the closed position.

2. Motor vehicle as in accordance with claim 1, wherein the tailgate is also movable by the bearing means in lowering and raising motions between the closed position and a lowered open position in which the tailgate is located in essentially vertical alignment with a rear end of the motor vehicle.

3. Motor vehicle in accordance with claim 1, further comprising a drive means connected to a sliding block which is supported on the vertical guides and on which said bearing means is pivotally supported.

4. Motor vehicle in accordance with claim 1, wherein said cover means is movable out of a closed position, in which the cover means closes the upper trunk opening which borders a top edge of the tailgate in the closed position of the tailgate, into a front position for clearing the upper trunk opening.

5. Motor vehicle as in accordance with claim 4, wherein the cover means comprises a blind means which is windable onto a take-up shaft which is located hidden in front of the trunk opening.

6. Motor vehicle, comprising:

a vehicle body, a tailgate, bearing means movably supporting the tailgate on the motor vehicle for closing and for clearing a rear loading opening of a trunk space of the vehicle body, and a cover means for closing an upper trunk opening of the vehicle body, said cover means being formed of a plurality of cover parts which are movable forward from a closed position into an open position, the cover parts being supported on each side of the upper trunk opening, wherein the tailgate is mounted so as to be able to rearwardly swing out around a bottom edge thereof into a swung out horizontal position in which the tailgate forms a load-bearing surface and wherein the tailgate in said horizontal position is vertically movable by the bearing means for raising and lowering cargo thereon;

wherein the cover means of the trunk space is movable out of a closed position, in which the cover means closes the upper trunk opening which borders a top edge of the tailgate in the closed position of the tailgate, into a front position for clearing the upper trunk opening; and wherein the cover parts are guided on guides which are located on each side of the trunk opening, and wherein a lifting arrangement is provided on the guides for raising the cover parts and pressing them against a bearing section of the respective guide.

7. Motor vehicle in accordance with claim 1, wherein a movable cargo floor is provided on a inner side of the tailgate.

8. Motor vehicle in accordance with claim 1, wherein a cargo floor is mounted on a floor of the trunk space of the vehicle body in a manner enabling the cargo floor to move in a lengthwise direction of the motor vehicle body.

* * * * *